March 21, 1939. C. J. GLANZER 2,151,593

AIR CLEANER

Filed July 6, 1936

INVENTOR
CLARENCE J. GLANZER
BY Brockett, Hyde, Higley & Meyer
ATTORNEYS

Patented Mar. 21, 1939

2,151,593

UNITED STATES PATENT OFFICE 2,151,593

AIR CLEANER

Clarence J. Glanzer, Cleveland, Ohio, assignor to Air-Maze Corporation, Cleveland, Ohio, a corporation of Delaware Application July 6, 1936, Serial No. 89,006

4 Claims. (Cl. 183—15)

This invention relates to air cleaners for employment in connection with engines such as internal combustion engines, compressors and the like, for preventing entry thereto, of dust and similar particles with which the atmosphere may be laden.

The general object of the invention is to prevent strain upon the cleaner parts and return to the atmosphere of such particle accumulations of the filter element, as upon sudden reverse flow caused by back fire of the engine, or blow-back of the compressor when the latter is suddenly unloaded. The invention is particularly applicable to cleaners employing wet filter elements of the general type disclosed in Patent No. 1,876,368, issued February 6, 1932 to G. M. Walton, wherein without the present invention blow-back would cause a loss of the filter washing liquid and discharge of dirt-laden spray to the atmosphere; and a further object of the invention is therefore to make provision for blow-back in such wet type of cleaner.

The invention embraces a large valved vent, located to be most effective for the purpose as will appear, and includes as a further object the provision of an auxiliary filter element to insure against entry to the engine of any uncleaned air by way of the vent during reseating of its valve. More particularly, objects of the invention are to so locate the vent with reference to the cleaner outlet and the filter element, and to so otherwise arrange the parts, that the vent opening may be of ample capacity and effectiveness to relieve the element, and its valve may be directly responsive to the velocity head of reverse flow through the outlet and hence will open with maximum speed.

Figure 1:
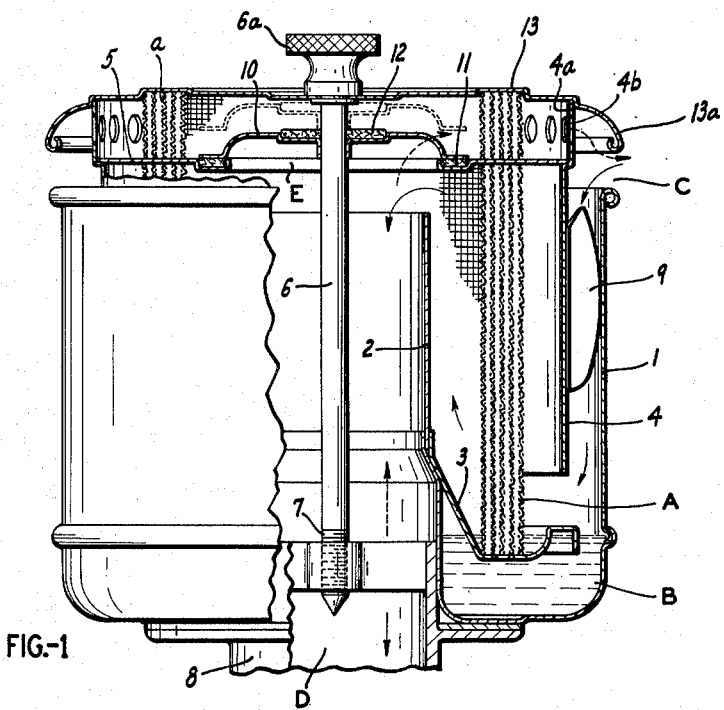
Figure 2:
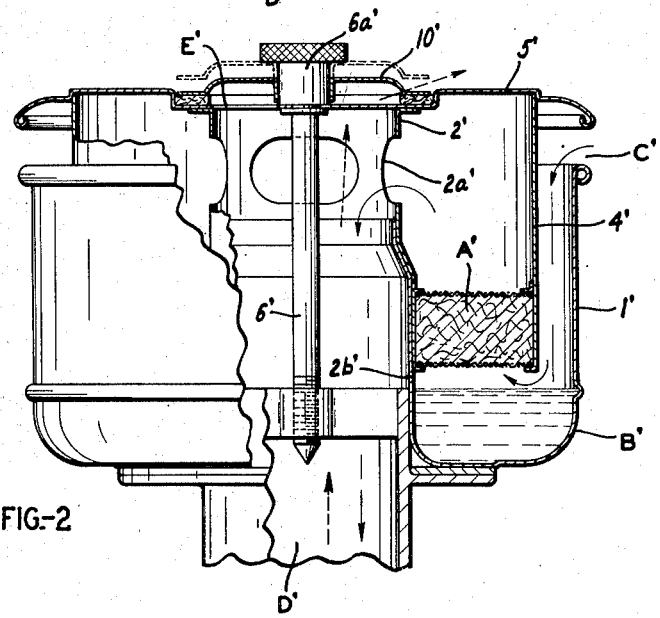

Further objects are to accomplish the described purposes by simple inexpensive means, as will be apparent from the following description taken in connection with the accompanying drawing, in which Fig. 1 is a view in elevation, parts being broken away generally as in typical section, showing an embodiment of the invention employing a cylindrical form of filter element and showing the vent valve in closed position in full lines, and in open position in broken lines; Fig. 2 is a view generally similar to Fig. 1 but showing an embodiment employing a disk form of filter element; in each of the figures the path of normal air flow being indicated by solid arrows, and the path of reverse air flow being indicated by broken arrows.

With reference now to the drawing and first to the embodiment of Fig. 1, a cylindrical filter element A and a liquid bath B therefor, are employed, the cleaner including structure providing a path for normal air flow through the filter. Such structure includes a lower annular unit containing the liquid B having an outer cylindrical wall 1, an inner cylindrical wall 2, and an imperforate flange 3 extending from the inner wall 2 for support of the filter element A and closure of its lower end. The cleaner structure also includes an upper unit having a cylindrical wall 4 disposed between the filter element and the wall 1 with its lower extremity clearing the liquid B, and having a top wall 5 secured to and closing the upper end of the filter element.

The two units are maintained in the illustrated assembly by a central post 6 having a head 6a, rotatably associated with the upper unit and threaded as at 7 into a spider on the part 8 which supports the lower unit and which in practice has connection with the inlet of the engine to be served by the air cleaner; vanes 9 being disposed between the walls 1 and 4 to maintain concentricity of the assembled units.

It will be apparent that when the compressor is operating, the described structure provides an air path from the annular cleaner inlet C at the upper end of the wall 1 to its central outlet D at the lower end of the wall 2, by way of the filter element A, such path being as indicated by the solid arrows, the filter element being maintained wet by washing action of the normal air stream upon the liquid B, which action may be assisted by vibration of operation of the engine.

The structure thus far described is generally such as is more fully disclosed in the patents to which reference has been made.

To relieve the filter element from reverse flow, the wall 5 opposite the upper end of the wall 2 and consequently opposite the outlet passage defined by this wall, is provided with a vent opening E, and a valve 10 is slidably mounted upon the post 6 for control of this vent. A gasket 11 may be provided as a seat for the valve to insure a seal and silence in seating, and a washer 12 of felt or the like may be provided upon the valve, about the post 6, for seal, lubrication, and silence. The gasket 11 and washer 12 being carried by parts of sheet metal, these parts are deformed as illustrated to provide suitable seats therefor.

For outlet of air from the vent E by way of the normal inlet C, a cover wall 13 is mounted on an upwardly extended part 4a of the wall 4 and perforated as at 4b between the walls 5 and 13, and the wall 13 is preferably extended as at 13a to overhang the wall 1.

To insure cleaning of air which might be induced inwardly through the vent E during closing of the valve 10, an auxiliary filter element *a* is provided, of annular form located to be effective between the vent opening E and the perforations 4b.

It will be apparent that during normal operation of the engine served by the cleaner, pressure at the cleaner outlet D will be maintained substantially below atmosphere, and the post 6 being upright the valve 10 will maintain its seated position by gravity, so that air flow through the cleaner will be as indicated by the solid arrows. Upon blow-back by the engine, the pressure at the cleaner outlet D will rise above atmosphere and the valve 10 will be unseated upwardly as indicated in broken lines, permitting reverse flow of air in the cleaner as indicated in broken arrows, such flow being from the vent E through the auxiliary filter element *a*, the openings 4b and the cleaner inlet C, to atmosphere. Thus loss of the filter cleaning liquid is prevented, as is return to the atmosphere of any liquid or dust carried by the filter element at the moment. Opening motion of the valve is limited by the wall 13, the washer 12 being effective against this wall to damp the sound of opening. Immediately upon relief of the abnormal high pressure at the outlet D, the valve 10 reseats by gravity, the auxiliary filter element *a* serving to clean any air which may be drawn in through the vent E before attainment by the valve of its seated position.

Fig. 2 illustrates a cheaper and simpler construction generally similar, however, to that of Fig. 1. Here the filter element A' is of annular form disposed between the wall 4' of the upper unit and a wall 2' secured to a top wall 5' and perforated as at 2a'. The bath B' is located below the filter element A' and between an outer wall 1' and inner wall 2b' of the lower unit. Normal flow is thus as indicated by the solid arrows from the cleaner inlet C' to its outlet D' and by way of an upward pass through the filter element A'.

The top wall 5' is vented as at E' and a valve 10' is provided for this vent, the valve being centered on the head part 6a' of the post 6' which maintains the wall units in assembly.

Obviously upon rise in pressure at the outlet D' the valve 10' will be unseated and opened to its dotted line position, relieving pressure within the cleaner directly to atmosphere above the cleaner and preventing reverse flow through the filter element, and/or out through the inlet C'.

It is to be observed that in each of the illustrated constructions the valve is so located with reference to the cleaner outlet, being opposite the latter, that the valve will be directly responsive to the velocity head or dynamic pressure of reverse flow through the outlet. Further, the wall leading from the outlet toward the vent, acts as a nozzle upon reverse flow so that the valve instantly opens as under the impulse of a jet from such nozzle, moving in the direction of such jet.

What I claim is:
1. In an air cleaner, a filter element, structure providing a path for normal air flow by way of said element, said structure including means providing a vent located to permit reverse flow into said cleaner to avoid said element, and valve means for said vent arranged to be opened automatically upon said reverse flow, and auxiliary filter means arranged to be effective upon air in the path of said vent.

2. In an air cleaner, structure providing a path for normal air flow from an inlet to an outlet, and a path for reverse flow in the opposite direction, a filter element disposed in said normal path and a liquid bath arranged to maintain said element wet, said structure being arranged to provide a vent effective in said normal path between said element and said outlet, and valve means for said vent arranged to be opened automatically upon pressure at said outlet above that at said inlet, said reverse flow path including a part leading from said vent to said cleaner inlet, and auxiliary filter means in said reverse flow path part.

3. In a cleaner of the class described, an annular filter element, a central tubular fluid outlet positioned axially of said element, walls forming an annular chamber about said element and forming a liquid bath receiving sump below said element, a liquid bath in said chamber, there being fluid inlet means in said wall structure and above said bath level, there being wall structure for guiding fluid from said element to said outlet including a wall opposite the end of said tubular outlet, there being an outlet opening through said wall substantially axially alined with said tubular outlet, and normally closed valve means closing said opening and constructed and positioned to be opened by jet action of fluid in reverse flow through said tubular outlet.

4. In a cleaner of the class described, an annular filter element, a central tubular fluid outlet positioned axially of said element, wall structure forming an annular chamber about said element and forming a liquid bath receiving sump below said element, a liquid bath in said chamber, there being fluid inlet means in said wall structure and above said bath level, there being wall structure for guiding fluid from said element to said outlet including a wall opposite the end of said tubular outlet, there being an outlet opening through said wall substantially axially alined with said tubular outlet, said wall structure including separable parts and a post for maintaining their assembly, said post being positioned axially of said tubular outlet, and normally closed valve means closing said opening and constructed and positioned to be opened by jet action of fluid in reverse flow through said tubular outlet, said valve means being movably mounted on said posts.

CLARENCE J. GLANZER.